United States Patent [19]

Furtaw et al.

[11] Patent Number: 5,278,536
[45] Date of Patent: Jan. 11, 1994

[54] ELECTROMAGNETIC RADIATION NODE FOR USE IN A NETWORK AND LIGHTING ELEMENT INCORPORATING SUCH A NODE

[75] Inventors: Robert W. Furtaw, Schaumburg; Richard A. Comroe, Dundee; Bradley M. Hiben, Glen Ellyn, all of Ill.

[73] Assignee: Motorola, Inc., Schaumburg, Ill.

[21] Appl. No.: 636,835

[22] Filed: Jan. 2, 1991

[51] Int. Cl.⁵ .................. H04B 3/00; H04M 11/00
[52] U.S. Cl. ....................... 340/310 A; 340/310 R; 340/310 CP
[58] Field of Search ............... 340/310; 359/172, 152, 359/142, 118

[56] References Cited

U.S. PATENT DOCUMENTS

| | | | |
|---|---|---|---|
| 3,818,466 | 6/1974 | Honda | 340/310 CP |
| 3,971,028 | 7/1976 | Funk | 340/310 CP |
| 4,703,306 | 10/1987 | Barritt | 340/310 A X |
| 4,768,020 | 8/1988 | Chen | 340/567 |
| 4,815,106 | 3/1989 | Propp et al. | 340/310 R X |
| 4,977,618 | 12/1990 | Allen | 359/172 X |
| 5,068,916 | 11/1991 | Harrison et al. | 359/118 X |
| 5,081,440 | 1/1992 | Ott et al. | 340/310 A |

Primary Examiner—Donnie L. Crosland
Attorney, Agent, or Firm—J. Ray Wood

[57] ABSTRACT

A network (2) utilizing power conductor distribution and incorporating infra-red (IR) radiation nodes having IR transducers (4, 6, 8). The IR transducers are located in ceiling-mounted lighting fixtures (16, 18, 20) and are connected to power terminals in the lighting fixtures both for powering the IR transducers in operation and for communicating network information. The transducers are thus positioned optimally for good IR communication and require no additional cabling.

16 Claims, 2 Drawing Sheets

ELECTROMAGNETIC RADIATION NODE FOR USE IN A NETWORK AND LIGHTING ELEMENT INCORPORATING SUCH A NODE

BACKGROUND OF THE INVENTION

This invention relates to electromagnetic radiation nodes for use in a network, and particularly for use in a network utilizing power conductor network distribution.

Networks utilizing power conductor network distribution are well known in the art. In such a network within a building, information is conveyed or distributed around the network using power conductors or cables which typically already exist in the building. In such a power conductor distribution network the alternating power supply voltage is used as a carrier, on which is modulated the network data or information. In such a power conductor distribution network, terminals of the network are typically powered and connected to the network via the same connection.

Networks utilizing electromagnetic radiation nodes are also known in the art. In such networks, network information or data is transceived between a node and one or more terminals of the network by electromagnetic radiation, such infra-red (IR) radiation, carrying the network data or information. It is usual for such an electromagnetic node to be positioned at a point, such as in the middle of a ceiling, where its field of view of its terminals (which are typically near ground level) is widest and least obstructed. Such electromagnetic radiation nodes in known networks require, of course, their own cabling for power and signal connection to the rest of the network.

SUMMARY OF THE INVENTION

It is an object of the present invention to provide an improved electromagnetic radiation node for use in a network utilizing power conductor network distribution in which the electromagnetic node may be conveniently and advantageously positioned.

In accordance with a first aspect of the invention there is provided an electromagnetic radiation node for use in a network utilizing power conductor network distribution, the electromagnetic radiation node comprising:

an electromagnetic-electric transducer for transducing network information between electromagnetic and electric forms; and connector means for coupling the electromagnetic-electric transducer to a power conductor of the network, wherein the connector means is adapted to connect to the power terminals of a lighting element, whereby the electromagnetic radiation device is powered from the power terminals of the lighting element and coupled to the network via the power terminals of the lighting element.

It will be appreciated that by adapting such an electromagnetic radiation node to be connected to the power terminals of a lighting element, e.g. a ceiling mounted lighting fixture, there is no need for further dedicated cabling to be provided to the electromagnetic radiation node since it can make its power and signal connections via the power terminals of the lighting element. It will further be appreciated that by adapting such an electromagnetic radiation node to be connected to a lighting element, e.g. a ceiling mounted lighting fixture, the electromagnetic radiation node is inherently connected adjacent a convenient position from which its field of view of terminals of the network is wide and relatively unobstructed, and so the electromagnetic radiation node may be most conveniently positioned at an optimum location.

In accordance with a second aspect of the invention there is provided a lighting element having power terminals and including an electromagnetic radiation node for use in a network utilizing power conductor network distribution, the electromagnetic radiation node comprising:

an electromagnetic-electric transducer for transducing network information between electromagnetic and electric forms; and connector means connecting the electromagnetic-electric transducer to the power terminals of the lighting element, whereby the electromagnetic radiation device is powered from the power terminals of the lighting element and is coupled to the network via the power terminals of the lighting element.

It will be appreciated that by providing a lighting element with an electromagnetic radiation node in this way, both the lighting element and the electromagnetic radiation node are able to share the same power terminals and the electromagnetic radiation node is able to use these same power terminals for its signal connection. It will further be appreciated that by providing the the electromagnetic radiation node as part of the lighting element, the electromagnetic radiation node is automatically positioned with the lighting element, e.g. in a ceiling mounted lighting fixture, at an optimum location from which its field of view of terminals of the network is wide and relatively unobstructed.

In a preferred embodiment of the invention the lighting element is provided in the form of a ballast for a gas discharge lamp.

BRIEF DESCRIPTION OF THE DRAWINGS

One network utilizing power conductor network distribution and incorporating electromagnetic radiation nodes in accordance with the present invention will now be described, by way of example only, with reference to the accompanying drawings, in which.

DESCRIPTION OF THE PREFERRED EMBODIMENT

Figure 1:
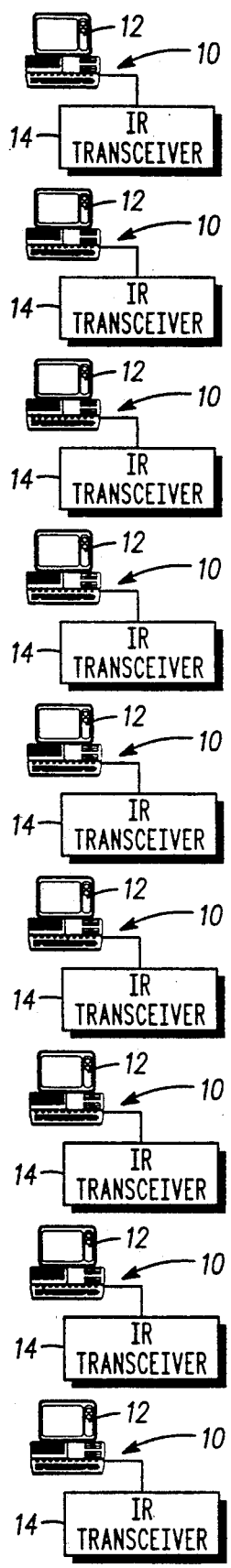
FIG. 1 shows a schematic circuit diagram of part of the network.
Figure 1:
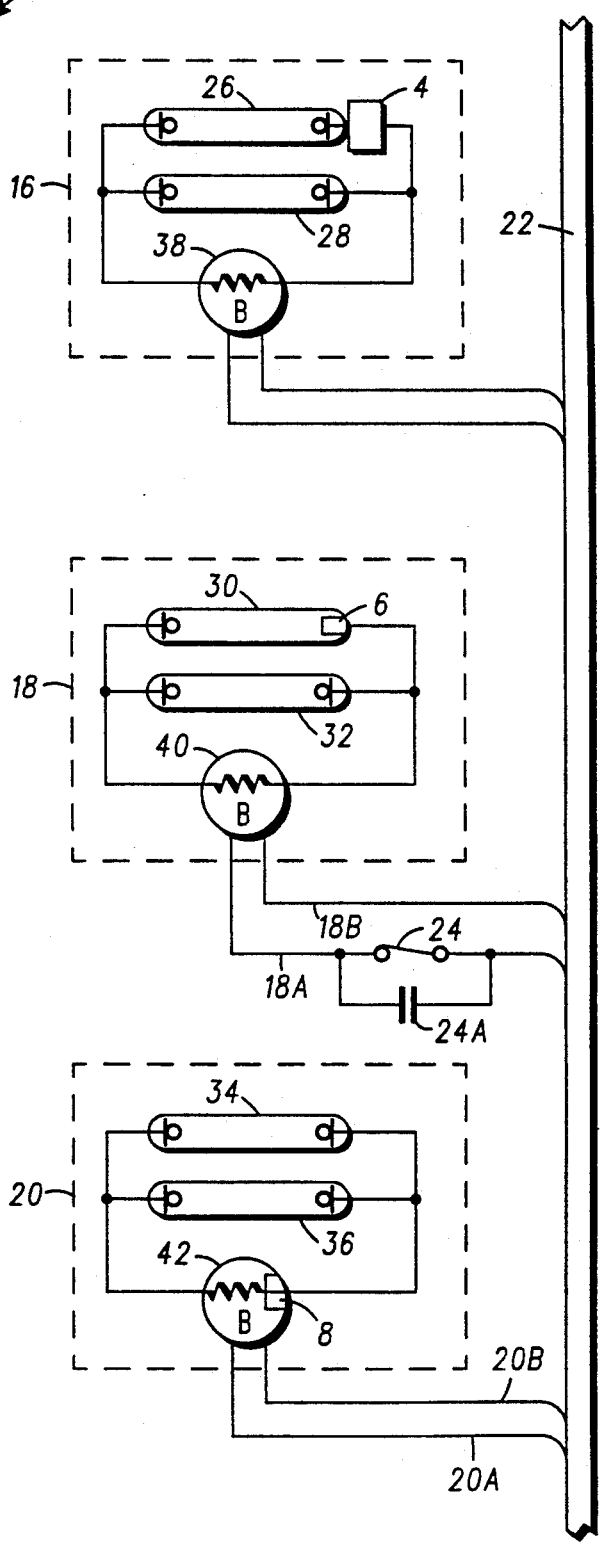

Referring now to FIG. 1, an in-building, local-area-network 2 incorporates infra-red (IR) transceivers 4, 6, 8 and population of network terminals 10, each typically in the form of a stand-alone computer 12 equipped with an IR transceiver 14. The design and operation of the transceivers 4, 6, 8 and 14 are well known (except for the power and signal connections of the transceivers 4, 6 and 8, which will be described and discussed below) in the art, and so need not be described in further detail herein. The network uses power conductor network distribution.

The transceivers 4, 6 and 8 are located (as will be described below) in lighting fixtures 16, 18 and 20 respectively which are mounted in ceilings (not shown) of a building (not shown) to illuminate floors (not shown) of the building.

The lighting fixtures 16, 18 and 20 are powered from the alternating current (AC) mains via individual power cables 16a, 16b, 18a, 18b and 20a, 20b which are connected to a central power cable 22. Power to the lighting fixtures 16, 18 and 20 may be individually switched, as for example by a switch 24, from the central power cable 22, or may all be simply switched simultaneously by a switch (not shown) to the central power cable 22. Where the lighting fixtures 16, 18 and 20 are individually switched from the central power cable 22, such as by the switch 24, a high pass filter 24a in the form of a capacitor is connected in parallel with the switch, for reasons which will be explained below.

Each of the lighting fixtures 16, 18 and 20 has two fluorescent lamps 26 and 28, 30 and 32 and 34 and 36 respectively powered from its individual power cables via a ballast 38, 40 and 42 respectively. The fluorescent lamps 26, 28, 32, 34 and 36 are all standard lamps with power terminals of standard size and spacing. The fluorescent lamp 30 also has power terminals of standard size and spacing, but differs internally from the other lamps 26, 28, 32, 34 and 36 as will be described below. The ballasts 38 and 40 are conventional two-lamp ballasts. The ballast 42 differs from a conventional ballast only in that it also incorporates the IR transducer 8; the ballast 42 is in all other ways conventional.

Figure 2:
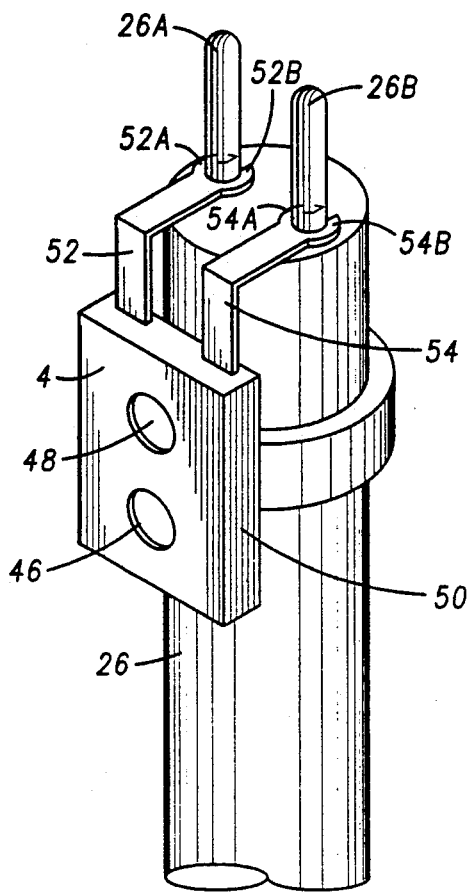
FIG. 2 shows a first electromagnetic radiation node of the network attached to a fluorescent lamp.

Referring now to FIG. 2, the IR transceiver 4 in the lighting fixture 16 has an IR transmitter 46 and an IR receiver 48 housed in a single casing 50 The transmitter 46 and receiver 48 are standard infra-red electromagnetic-electric transducers. The IR transceiver 4 also has extending from the casing two connection terminals 52 and 54 for both power and signal connection. The IR transceiver connection terminals 52 and 54 extend from the casing 50, are bent through 90° and each end in two prongs 52a and 52b and 54a and 54b, which are a push-on, interference fit to power terminals 26a and 26b of the fluorescent lamp 26. A clip 56 is attached to the casing 50 and fastens the IR transceiver 4 to the lamp 26.

Figure 3:
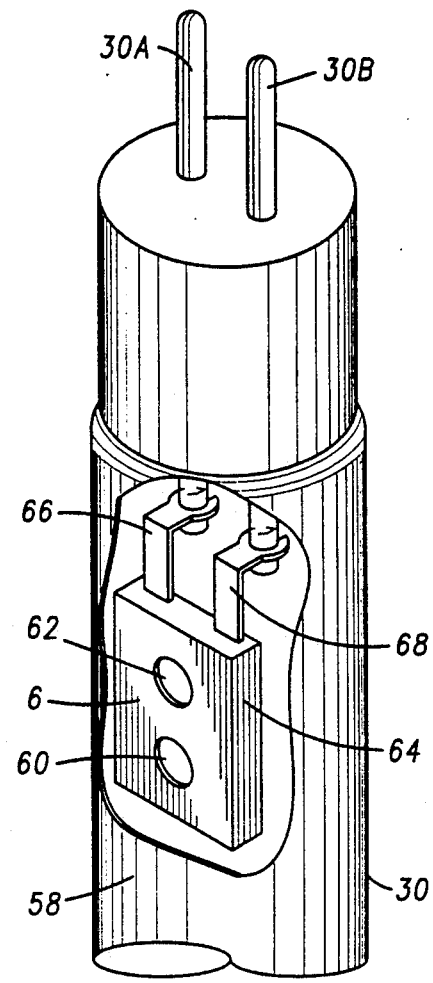
FIG. 3 shows a partially cut-away view of a second electromagnetic radiation node of the network housed within the glass envelope of a fluorescent lamp.

Referring now to FIG. 3, in the lighting fixture 18, the IR transceiver 6 is built into the glass envelope 58 of the fluorescent lamp 30. The lamp 30 is in all other ways conventional. The IR transceiver 6 in the fluorescent lamp 30 has an IR transmitter 60 and an IR receiver 62 housed in a single casing 64 The transmitter 60 and receiver 62 are standard infrared electromagnetic-electric transducers. The IR transceiver 6 also has extending from the casing two connection terminals 66 and 68, for both power and signal connection, which are permanently connected within the glass envelope 58 of the lamp to the lamp's power terminals 30a and 30b which extend externally of the lamp. In use of the transceiver 6, infra-red radiation is transmitted by transmitter 60 and received by the receiver 62 through the glass envelope 58 of the lamp 30, which is transparent to the IR frequencies used.

Figure 4:
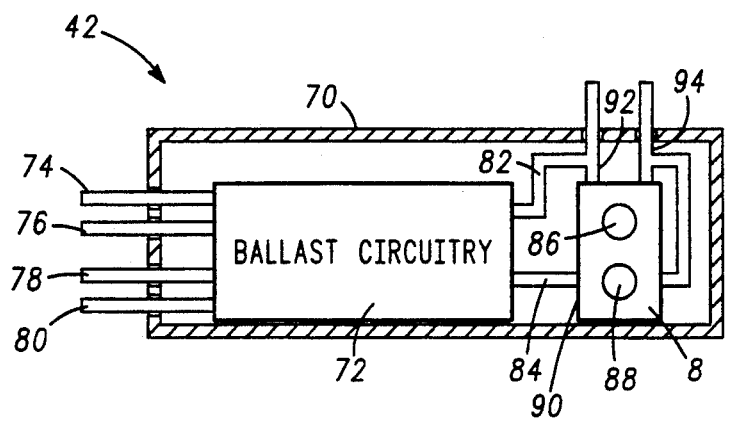
FIG. 4 shows a cross-sectional view of a fluorescent lamp ballast incorporating a third electromagnetic radiation node of the network.

Referring now to FIG. 4, in the lighting fixture 20, the IR transceiver 8 is built into the ballast 42. The ballast 42 includes a casing 70 which houses ballast circuitry 72 and from which extend connection terminals 74 and 76 and 78 and 80 for driving the fluorescent lamps 34 and 36 and also connection terminals 82 and 84 for connecting to the individual power cables 20a and 20b of the lighting fixture 20. The casing 70 also houses the IR transceiver 8. The IR transceiver 8 has an IR transmitter 86 and an IR receiver 88 housed in a single casing 90. The transmitter 86 and receiver 88 are standard infra-red electromagnetic-electric transducers. The IR transceiver 8 also has extending from the casing 90 two connection terminals 92 and 94, for both power and signal connection, which are permanently connected within the ballast casing 70 to the ballast's power terminals 82 and 84. The IR transceiver casing 90 is attached to the interior surface of the ballast casing 70, which is provided with two mating holes (not shown) through which the IR transmitter 86 can "see" and through which the IR receiver 88 can be "seen". The ballast circuitry 72 includes a by-pass (not shown) for the network information signals.

In use of the network 2, the lamp 26, the lamp 30 and the ballast 42 are positioned in their respective lighting fixtures so that the IR transducers 4, 6 and 8 face downwards to the floor, allowing the IR transceivers 4, 6 and 8 to communicate via infra-red links with the IR transceivers 14 of the network terminals. The IR transceivers 4, 6 and 8 act as nodes of the network, and communicate network information with each other (and with any other network nodes) via their connections to the power terminals in their respective lighting fixtures, the individual power cables of their respective lighting fixtures and the central power cable 22, modulating the AC power voltage carrier with high frequency network information signals in known manner. The IR transceivers 4, 6 and 8 also draw their power for operation from the power terminals in their associated lighting fixtures.

It will be understood that in use of the network 2, the high pass filter 24a connected in parallel with the switch 24 to the lighting fixture 18 serves to allow the high frequency signals carrying network information in the power cables to travel to and from the IR transducer 6, even if the switch 24 is open.

It will be appreciated that by positioning the IR transducers 4, 6 and 8 in the ceiling mounted lighting fixtures 16, 18 and 20, the IR transducers 4, 6 and 8 are optimally positioned for communicating with the terminal IR transceivers 14 which are typically near ground level.

It will also be appreciated by connecting the IR transducers 4, 6 and 8 to power terminals in the lighting fixtures and using the connections both for powering the IR transducers and for communicating network information, there is no need for further network infrastructure in the form of additional cabling.

Thus it will be appreciated that the network provides optimal network performance with minimum additional infrastructure.

It will be appreciated that although in the foregoing description the transceivers 4, 6, 8 and 14 are described as infra-red any suitable frequency of electromagnetic radiation may alternatively be used, for example radio frequency (RF) radiation.

It will be appreciated that various other modifications or alternatives to the above described embodiments will be apparent to the man skilled in the art without departing from the inventive concept of using the power terminals of a lighting element to provide connection for both power and network information communication, and convenient optimal positioning for an electromagnetic radiation node.

We claim:

1. An electromagnetic radiation node for use in a network, the network comprising a plurality of network terminals, the network terminals generating network information, the network information shared commonly with other network terminals, the network utilizing power conductor network distribution, where the power conductor also energizes at least one lighting element, the lighting element having a power terminal connected to the power conductor, the electromagnetic radiation node comprising:
   a transducer for transducing network information;
   a connector coupled to the power conductor by way of the power terminal and to the transducer; and
   a fastener attaching the transducer to the lighting element;
   whereby the transducer is coupled to the network via the power terminal.

2. An electromagnetic radiation node according to claim 1 wherein the transducer is an infrared transducer.

3. An electromagnetic radiation node according to claim 1 wherein the transducer comprises an electromagnetic transmitter.

4. An electromagnetic radiation node according to claim 1 wherein the transducer comprises an electromagnetic receiver.

5. The electromagnetic radiation node according to claim 1 wherein the transducer is a receiving transducer for transducing network information from electromagnetic form to electric form, and said radiation node further comprises:
   a transmitting transducer for transducing network information from electric form to electromagnetic form;
   a transmitting transducer connected coupled to the power conductor by way of the power terminal and to the transmitting transducer, and
   a transmitting transducer fastener attaching the transmitting transducer to the lighting element.

6. A lighting element for use in a network, the network comprising a plurality of network terminals, the network terminals generating network information in an electromagnetic form, the network information shared commonly with other network terminals, the network utilizing power conductor distribution where network information is distributed to other network terminals in an electric form, comprising:
   a power terminal connected to the power conductor;
   a transducer for transducing network information between electromagnetic and electric forms,
   a connector coupling the transducer to the power terminal;
   whereby the transducer is coupled to the network via the power terminal.

7. A lighting element according to claim 6 wherein the lighting element is a lamp.

8. A lighting element according to claim 7 wherein the lamp is a gas discharge lamp.

9. A lighting element according to claim 8 wherein the gas discharge lamp is a fluorescent lamp.

10. A lighting element according to claim 7 wherein the transducer is attached to the outside of the lamp.

11. A lighting element according to claim 7 wherein the transducer is located within the lamp.

12. A lighting element according to claim 6 wherein the lighting element is a ballast for a gas discharge lamp.

13. A lighting element according to claim 6 wherein the transducer is an infrared transducer.

14. A lighting element according to claim 6 wherein the transducer comprises an electromagnetic transmitter.

15. A lighting element according to claim 6 wherein the transducer comprises an electromagnetic receiver.

16. A lighting element according to claim 6 wherein the transducer comprises an electromagnetic transceiver.

* * * * *